United States Patent
Ross et al.

[11] Patent Number: 6,103,404
[45] Date of Patent: *Aug. 15, 2000

[54] LASER TEXTURED MAGNETIC DISK COMPRISING NINB

[75] Inventors: Caroline A. Ross, Boston, Mass.; Martin P. Rosenblum, Menlo Park; David Treves, Palo Alto, both of Calif.

[73] Assignee: Komag, Inc., San Jose, Calif.

[*] Notice: This patent is subject to a terminal disclaimer.

[21] Appl. No.: 08/905,292

[22] Filed: Aug. 1, 1997

Related U.S. Application Data

[63] Continuation-in-part of application No. 08/657,222, Jun. 3, 1996, Pat. No. 5,980,997.

[51] Int. Cl.[7] .................................................. B32B 15/00
[52] U.S. Cl. .................... 428/680; 360/86; 360/99.08; 360/135; 365/189.01; 427/256; 427/287; 427/376.3; 427/376.4; 427/376.7; 427/376.8; 427/383.3; 427/383.7; 428/65.3; 428/65.6; 428/457; 428/689
[58] Field of Search .................................... 427/555, 556, 427/597, 287, 256, 376.3, 376.4, 376.7, 376.8, 383.3, 383.7; 360/86, 99.08, 135; 365/189.01; 428/668, 65.6, 680, 457, 689, 653

[56] References Cited

U.S. PATENT DOCUMENTS

| | | | |
|---|---|---|---|
| 4,786,564 | 11/1988 | Chen et al. | 428/694 |
| 4,833,001 | 5/1989 | Kijima et al. | 428/141 |
| 4,863,810 | 9/1989 | Bhattacharya et al. | 428/661 |
| 5,062,021 | 10/1991 | Ranjan et al. | 360/135 |
| 5,087,481 | 2/1992 | Chen et al. | 427/129 |
| 5,108,781 | 4/1992 | Ranjan et al. | 427/53.1 |
| 5,153,044 | 10/1992 | Chen et al. | 428/64 |
| 5,180,640 | 1/1993 | Yamashita et al. | 428/611 |
| 5,250,339 | 10/1993 | Tani et al. | 428/64 |

FOREIGN PATENT DOCUMENTS

| | | |
|---|---|---|
| 0652554 A1 | 5/1995 | European Pat. Off. . |
| 7182655 | 7/1995 | Japan . |

OTHER PUBLICATIONS

Baumgart et al, "Safe Landings: Laser Texturing of High-Density Magnetic Disks," Mar. 1996, *Data Storage*, pp. 21–24.
Lowenheim, "Modern Electroplating," pp. 593–595, 710–725, John Wiley & Sons, 1974.
Perettie, "Alternative Substrates: The Critical Issues." *INSIGHT*, Nov./Dec. 1995, vol. VIII, No. 6.
Krajnovich et al, "Experimental and Theoretical Studies of Bump Formation During Laser Texturing of Ni–P," IEEE, 1996. (No month avail.).
Teng et al, "Laser Zone Texture on Alternative Substrate Disks," IEEE, 1996, Intermag Conference. (No month avail.).
Baumgart et al, "A New Laser Texturing Technique for High Performance Magnetic Disk Drives," IEEE Transactions on Magnetics, vol. 31, No. 6, Nov. 1995.
Dialog Printout, May 17, 1997, pp. 1–157.

*Primary Examiner*—Bernard Pianalto
*Attorney, Agent, or Firm*—Kenneth E. Leeds

[57] ABSTRACT

A method for manufacturing a magnetic disk comprises the steps of depositing NiP (20) on a substrate (22); depositing NiNb (24) on the NiP; and laser texturing the NiNb. "Sombrero" shaped texture features are more easily formed on the substrate/NiP/NiNb structure than a substrate/NiP structure. The disk is completed by depositing an underlayer (e.g. sputtered Cr or NiP), a magnetic layer (e.g. a Co alloy) and a protective overcoat (e.g. by hydrogenated carbon).

19 Claims, 8 Drawing Sheets

LASER TEXTURED MAGNETIC DISK COMPRISING NINB

This application is a continuation in part of U.S. patent application Ser. No. 08/657,222, filed Jun. 3, 1996, now U.S. Pat. No. 5,980,997, incorporated herein by reference.

BACKGROUND OF THE INVENTION

This invention pertains to a method for texturing a magnetic disk and the resulting disk.

It is known in the art to manufacture magnetic disks by the following process:
   a) plating a NiP layer on an Al substrate;
   b) laser texturing the NiP layer;
   c) depositing an underlayer (e.g. Cr) on the NiP layer; and
   d) depositing a magnetic layer (e.g. a Co alloy) on the underlayer.

Such a process is discussed in U.S. Pat. No. 5,062,021, issued to Ranjan et al., incorporated herein by reference. When one laser textures NiP, under most conditions, one forms a "ridge-shaped" texture feature, e.g. as shown in FIG. 1.

It is possible to form texture features having "sombrero" shapes on NiP, e.g. as shown in FIG. 2, if one uses a wide spot size and a short laser pulse. Such sombreros typically include a central bump 1 surrounded by a depression 2 which in turn is surrounded by a ridge 3. Magnetic disks having sombrero texture features are believed to have better CSS characteristics, i.e. lower friction and stiction between the magnetic disk and a read-write head. ("CSS" means "contact-start-stop", and refers to operation of a magnetic disk drive when it is turned off and then on.) It is desirable to form sombreros having heights less than about 20 nm while ensuring that the ridge 3 surrounding central sombrero bump 1, if any, has a height at least 5 nm less than the height of central bump 1 (and preferably at least 10 nm less than the central bump height).

The reason for keeping the height of central bump 1 below 20 nm is to reduce or eliminate interference between the flying read-write head and the bumps. It is desirable to minimize the flying height of the read-write head with respect to the magnetic film of the disk to maximize magnetic recording performance. The reason for keeping ridge 3 at least 5 nm below the central bump height is to minimize stiction when the read-write head rests on the disk. (The disk typically includes a lubricant layer which can exacerbate stiction. The presence of a high ridge 3 in conjunction with the lubricant can further aggravate stiction.) Furthermore, after many CSS cycles, the top of the bump may exhibit wear. If the clearance between the central bump and the ridge is not sufficient, the effective contact area between the head and the disk would increase rapidly with wear, causing a large increase in stiction.

FIG. 7 shows the relationship between sombrero central bump heights and the iris diameter of a laser used to texture an NiP layer plated on an Al substrate for a selected laser power. (NiP plated Al is a common substrate used in magnetic disks.) Data are shown for laser pulses of 14 ns (curve 5a), 26 ns (curve 6a), 36 ns (curve 7a) and 50 ns (curve 8a). Also shown are the heights of ridges surrounding the sombrero bumps (curves 5b to 8b). As can be seen, there is only a small set of conditions under which one could form a sombrero with a height less than 20 nm, while simultaneously having a ridge height more than 10 nm less than the sombrero height.

FIG. 8 shows the relation between laser power and the sombrero central bump height for laser pulses of 14 ns and a spot size of 10 μm (curve 10), 20 ns pulses and a 10 μm spot size (curve 11), 30 ns pulses and a 11 μm spot size (curve 12), and 36 ns pulses and a 10.5 μm spot size (curve 13). In general, it is often desirable to use a laser power at the curve maximum. See U.S. patent application Ser. No. 08/574,423, filed by Hong Fu, et al., incorporated herein by reference. This is because laser power tends to vary, and it is desirable to avoid sombrero bump height variation caused by laser power variation. This adds a constraint to the texturing conditions which further makes it difficult to achieve a sombrero bump height lower than 20 nm and a ridge height at least 5 or 10 nm lower than the sombrero central bump height.

To summarize, it is difficult to form sombreros having desirable profiles with typical substrates such as NiP plated Al substrates. It would be desirable to be able to form low sombrero bump heights either lacking surrounding ridges, or with very low surrounding ridges.

SUMMARY

We have discovered a method for making a magnetic disk having sombrero shaped texture features. In one embodiment, a NiP layer is formed on a substrate, and a NiNb layer is formed on the NiP layer. The NiNb layer is then textured by applying laser pulses thereto. This process reliably results in sombrero texture features for a wide range of process parameters. The sombreros either lack a surrounding ridge or have a very low surrounding ridge.

A NiNb layer formed on NiP (hereinafter "NiNb/NiP") has several other advantages:
   1) NiNb is hard and prevents corrosion.
   2) One can form low sombrero bumps in NiNb/NiP.
   3) NiNb extends the conditions under which sombreros can be made. For example, on bare NiP, sombreros can only be made using wide spot sizes and low pulse durations. One can form sombreros on NiNb/NiP using small laser spot sizes with longer pulse durations. For example, one can use a 65 ns laser pulse to make sombreros on NiNb/NiP, which cannot be done on bare NiP. 65 ns lasers are common, and well qualified for manufacturing.

DETAILED DESCRIPTION

Figure 1:
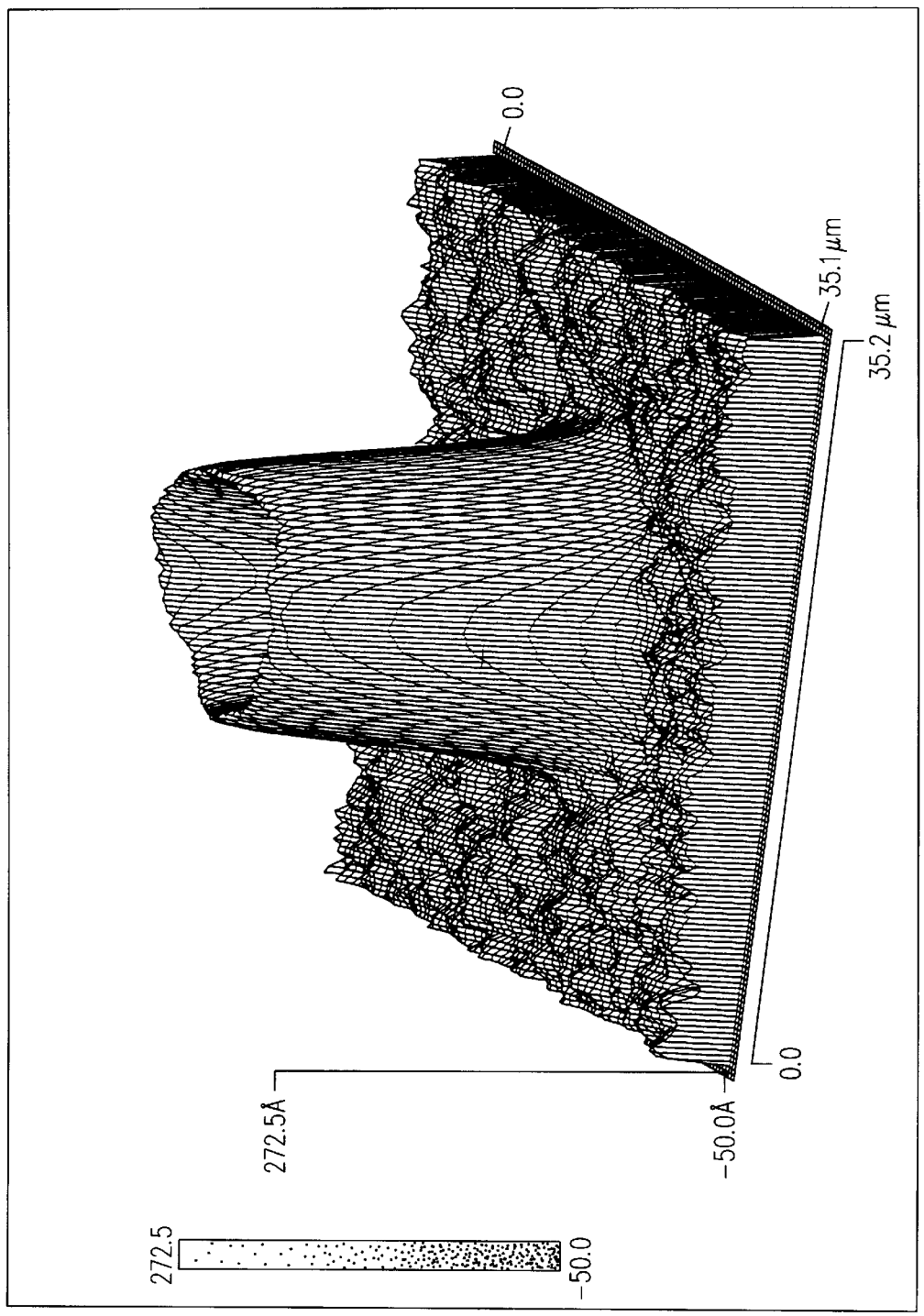
FIG. 1 illustrates a ridge-shaped texture feature.
Figure 2:
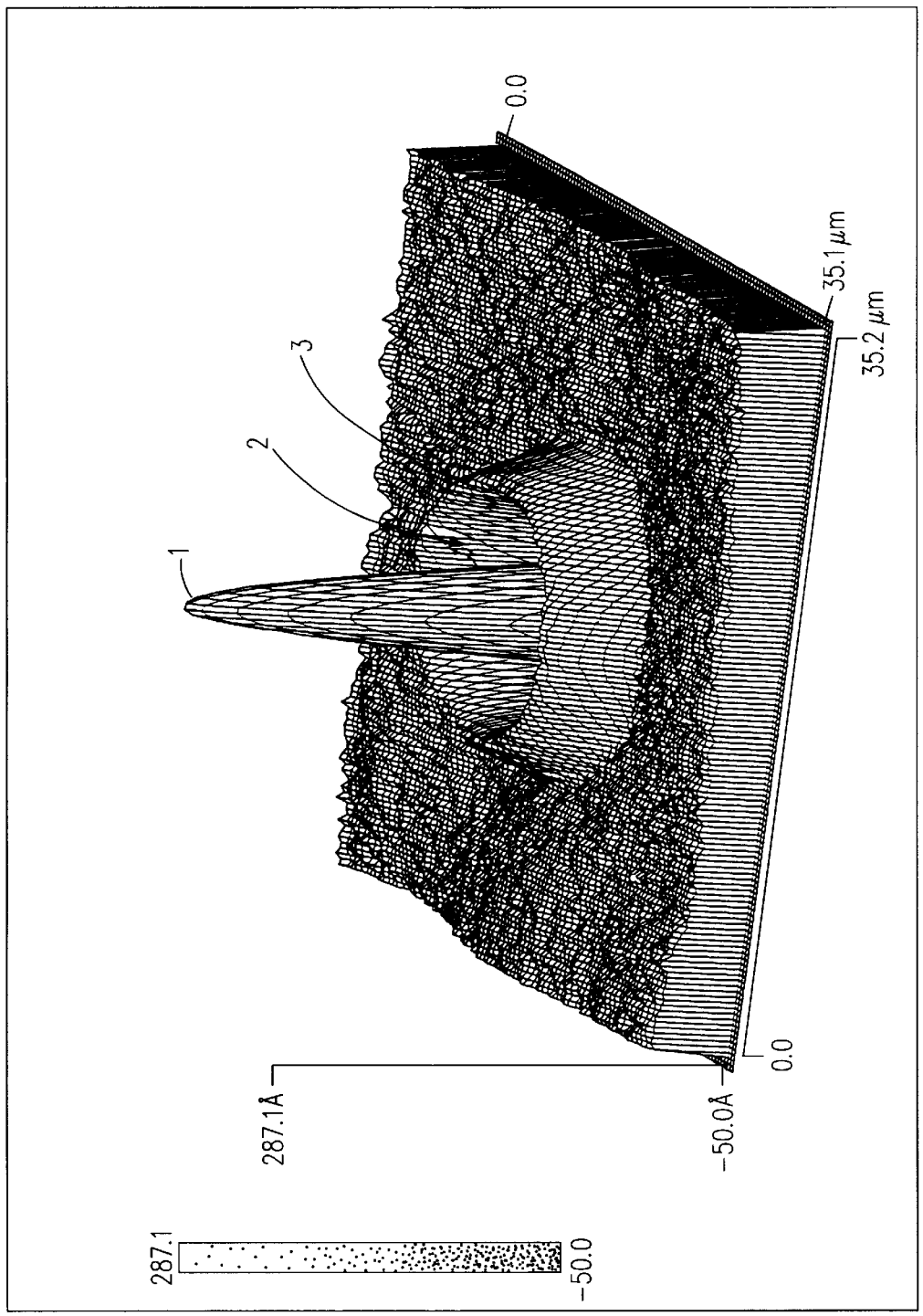
FIG. 2 illustrates a sombrero-shaped texture feature.
Figure 3:
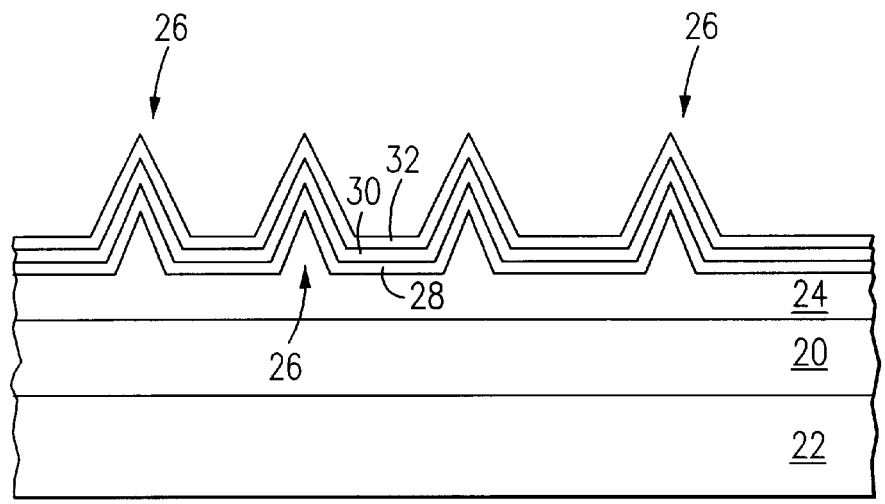
FIG. 3 illustrates in cross-section a magnetic disk constructed in accordance with our invention.

A method for manufacturing a magnetic disk in accordance with our invention includes the step of electroless plating a NiP layer 20 onto an Al alloy substrate 22. (See FIG. 3.) NiP layer is typically 6 to 10 μm thick, and generally about 8 μm thick. The NiP can be about 80 at. % Ni, 20 at. % P. Thereafter, a NiNb layer 24 is deposited on layer 20, e.g. to a thickness of 100 to 200 nm, and preferably to a thickness of 100 to 140 nm. The NiNb film is between 84 at. % Ni/16 at. % Nb to 40 at. % Ni/60 at. % Nb, and preferably between 55 at. % Ni/45 at. % Nb to 45 at. % Ni/55 at. % Nb, and in one embodiment, 50 at. % Ni/50 at. % Nb. In addition, the NiNb can be alloyed with other materials or additives.

In one embodiment, NiNb layer 24 is vacuum-deposited, e.g. by sputtering or evaporation, but other deposition techniques can also be used. For the case in which NiNb is formed by sputtering, the NiNb can be sputtered in an argon atmosphere at 6 mtorr, a power of 1 Kw, and a sputtering rate of 5.5 nm/sec.

Thereafter, the disk is textured, e.g. by applying a series of laser pulses to NiNb layer 24. A typical laser for texturing is model T20-V70-106Q available from Spectra Physics Corporation. This laser is a Q-switched, fiber-coupled diode-pumped solid state laser system with a wavelength of 1.064 μm and an average power of 1 Watt at 70 KHz with a pulse width of 70 ns (a minimum 14 μjoules/pulse). However, our invention is not limited to this type of laser or these parameters. Of importance, laser texturing results in sombrero texture features 26 in NiNb layer 24. The sombrero texture features typically have heights between 7 and 25 nm. There are typically no ridges surrounding the sombrero bumps, or if there are ridges, they have heights at least 5 nm lower than the sombrero central bump height, and in one embodiment, at least 10 nm lower than the central bump height.

The disk is completed by depositing an underlayer 28 (e.g. sputtered Cr or NiP), a magnetic cobalt alloy layer 30, and a protective overcoat layer 32 such as a hydrogenated carbon overcoat. (An example of a process for completing the manufacture of a magnetic disk is described in U.S. patent application Ser. No. 08/286,653, filed by Tu Chen, et al., assigned to the assignee of the present invention and incorporated by reference. Another example of an appropriate process is discussed in U.S. Pat. No. 5,180,640, issued to Yamashita, incorporated herein by reference. However, other processes for completing the disk can also be used.)

FIGS. 4a to 4k show laser textures formed in a structure comprising an Al alloy substrate, an 8μm thick NiP layer electroless plated on the substrate, and an NiNb layer sputtered onto the NiP. These figures were generated with an interferometric microscope. Table I below lists the thickness of the NiNb layers:

TABLE I

| FIG. NO. | NiNb thickness |
|---|---|
| 4a | 0 nm |
| 4b | 20 nm |
| 4c | 40 nm |
| 4d | 60 nm |
| 4e | 80 nm |
| 4f | 100 nm |
| 4g | 120 nm |
| 4h | 140 nm |
| 4i | 160 nm |

TABLE I-continued

| FIG. NO. | NiNb thickness |
|---|---|
| 4j | 180 nm |
| 4k | 200 nm |

As can be seen, if there is no NiNb (FIG. 4a) or only a small NiNb thickness, the texture features are ridge-shaped. For thicknesses greater than 60 nm, sombreros are formed (see FIG. 4e). Thus, it is seen sombreros can easily be formed in the NiNb layer.

Figure 5:
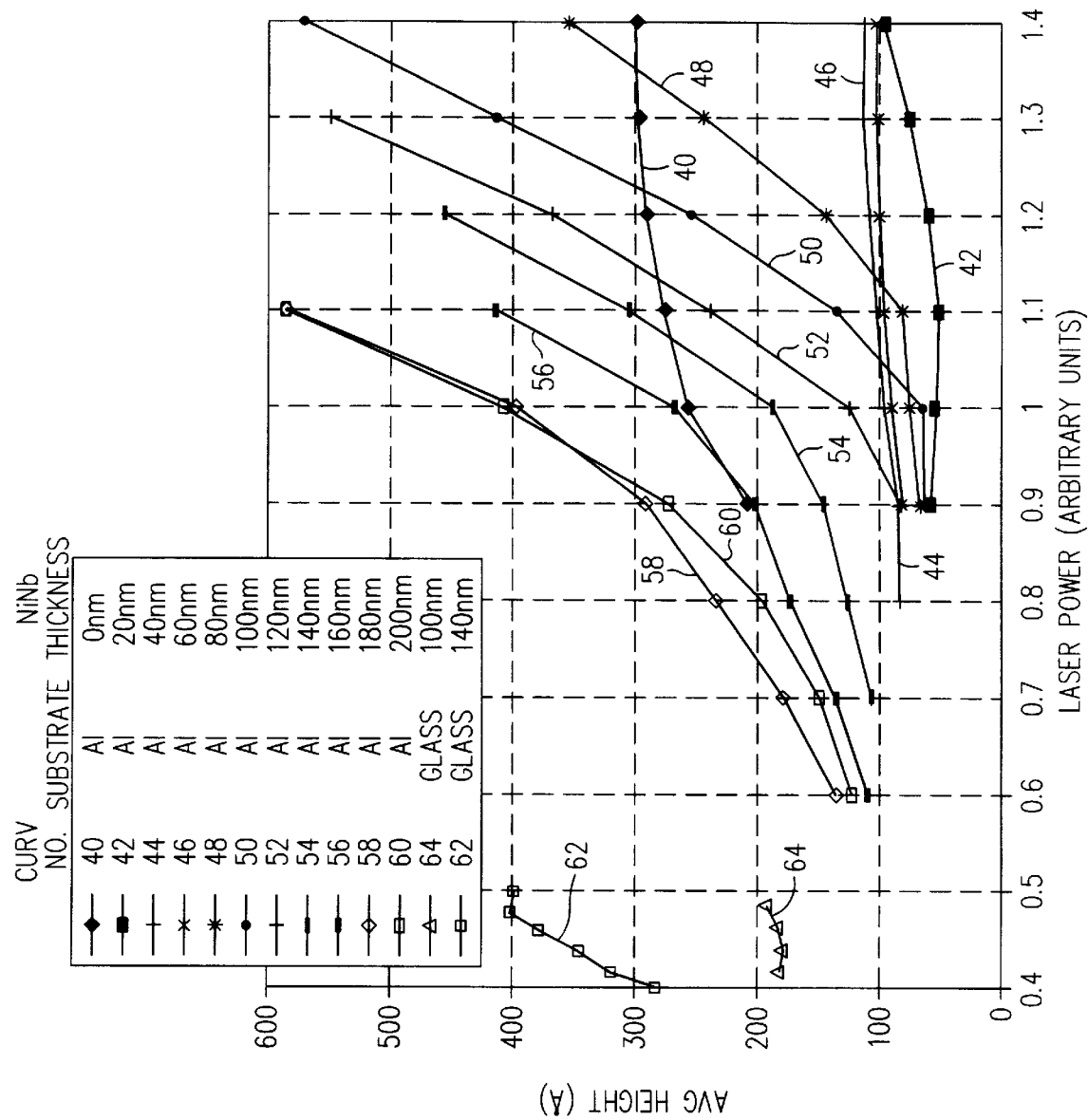
FIG. 5 illustrates the relation between laser power and texture feature height for a disk comprising an Al substrate, a NiP layer plated on the Al substrate and a NiNb layer sputtered on the NiP.
Figure 7:
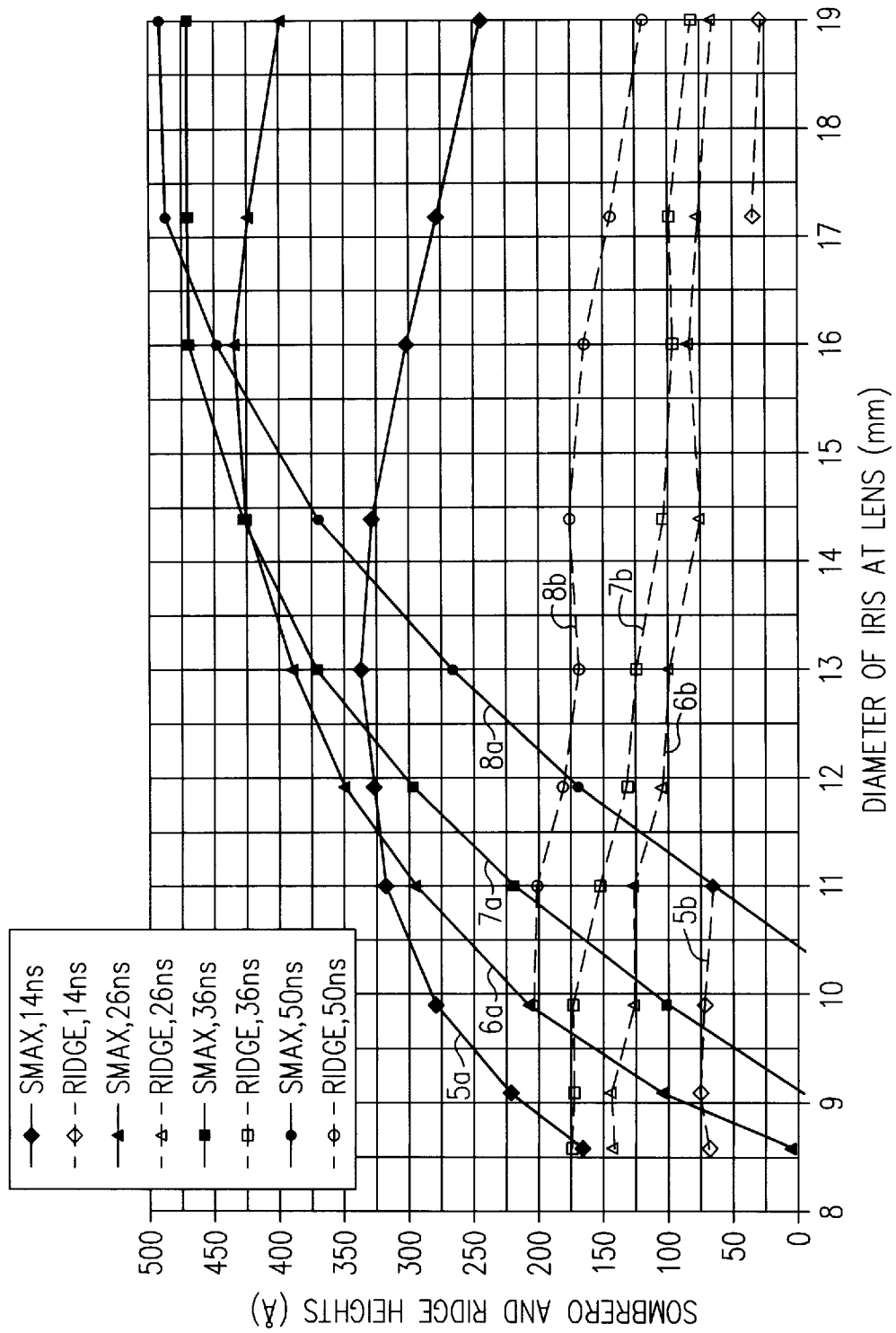
FIG. 7 shows the relationship between the height of a sombrero central bump (and ridge surrounding the sombrero bump) and the diameter of the iris of the laser used to form the sombrero bump in a prior art NiP film on a substrate.
Figure 8:
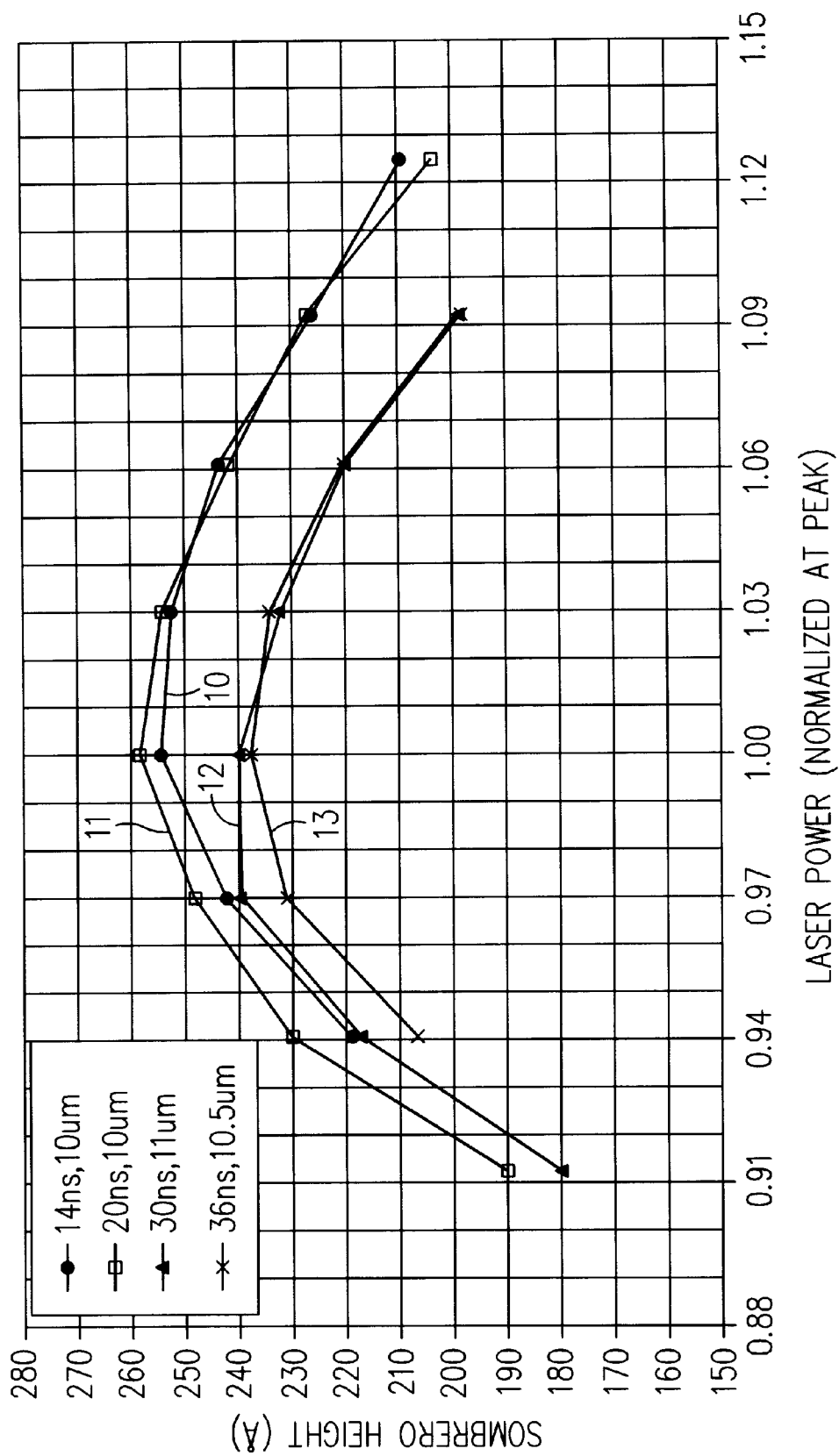
FIG. 8 shows the relation between the sombrero bump height and laser power for a prior art NiP film formed on a substrate.

FIG. 5 shows the relation between laser power the texture feature height. Table II below lists the curves and describes the disks used to generate the data in the curves. The asterisks in Table II indicate that the slope data was based on an extrapolation of data for other bump heights.

TABLE II

| Curve | Disk Structure | Slope (Å/% power change for a bump height of 20 nm) |
|---|---|---|
| 40 | Al alloy substrate/8 μm NiP/no NiNb | <4 |
| 42 | Al alloy substrate/8 μm NiP/20 nm NiNb | 3.5* |
| 44 | Al alloy substrate/8 μm NiP/40 nm NiNb | 0.4* |
| 46 | Al alloy substrate/8 μm NiP/60 nm NiNb | 0.8* |
| 48 | Al alloy substrate/8 μm NiP/80 nm NiNb | 14 |
| 50 | Al alloy substrate/8 μm NiP/100 nm NiNb | 12 |
| 52 | Al alloy substrate/8 μm NiP/120 nm NiNb | 11 |
| 54 | Al alloy substrate/8 μm NiP/140 nm NiNb | 11 |
| 56 | Al alloy substrate/8 μm NiP/160 nm NiNb | 6 |
| 58 | Al alloy substrate/8 μm NiP/180 nm NiNb | 4 |
| 60 | Al alloy substrate/8 μm NiP/200 nm NiNb | 4 |

FIG. 5 shows that, the greater the laser power, the greater the texture feature bump height. For NiNb thickness greater than 60 nm (i.e., for 60 to 200 nm), NiNb sombreros can easily be formed in a controlled fashion.

While in the above-described embodiment NiNb is deposited on NiP which in turn is plated onto an Al substrate, in other embodiments, an intermediate layer such as Cr or Ta is interposed between the NiNb and the NiP.

In other embodiments, a NiP layer is not formed on the Al substrate, and another material is formed between the NiNb and the Al substrate.

In another embodiment, the NiNb is formed directly on the Al substrate.

In another embodiment, in lieu of an Al substrate, other materials such as glass, glass ceramic, SiC, Si, ceramic or other material is used for the substrate. The NiNb can be formed directly on the substrate. Alternatively, an intermediate layer such as a metal (e.g. Cr or Ta) can be formed between the NiNb and the substrate. Such a layer can be formed by sputtering, evaporation or other appropriate technique.

INDUSTRIAL APPLICATION

Figure 6:
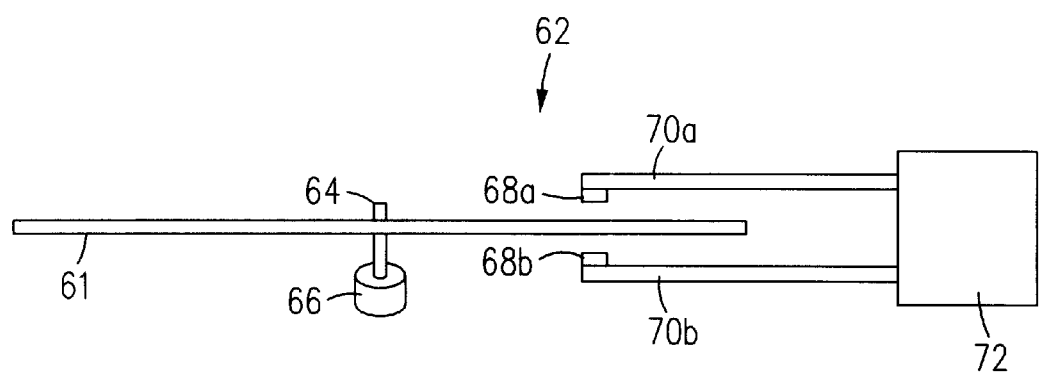
FIG. 6 shows a disk drive including a magnetic disk constructed in accordance with our invention.
Figure 4A:
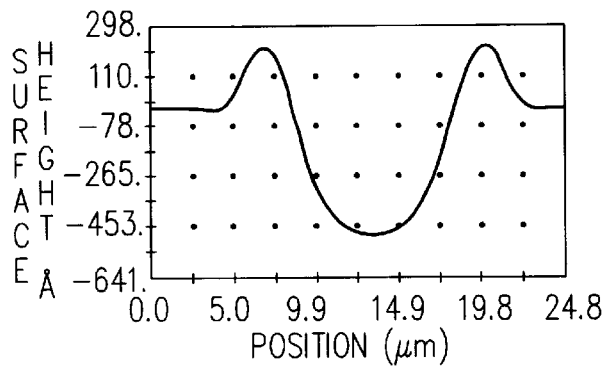
FIGS. 4a, b, c, d, e, f, g, h, i, j and k show texture features on a magnetic disk including a NiNb layer formed on a NiP layer. These texture features were generated with laser pulses of 65 ns duration.
Figure 4B:
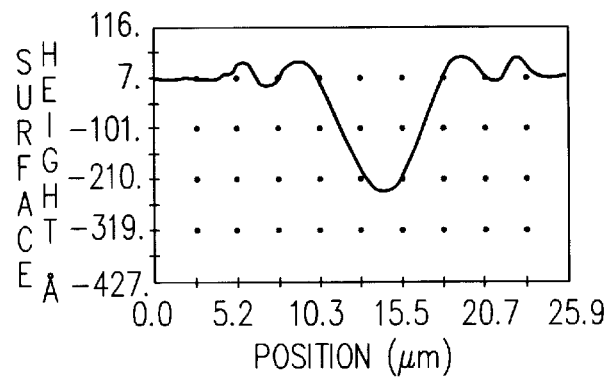
Figure 4C:
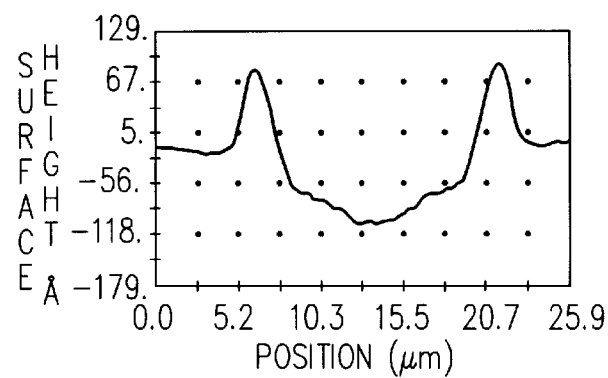
Figure 4D:
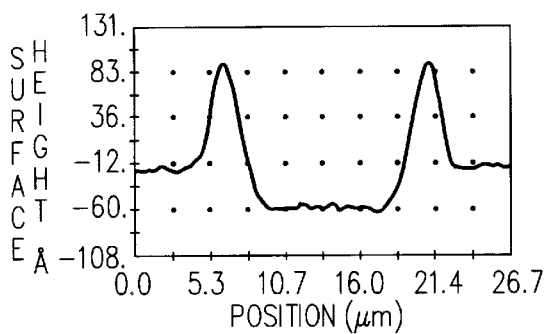
Figure 4E:
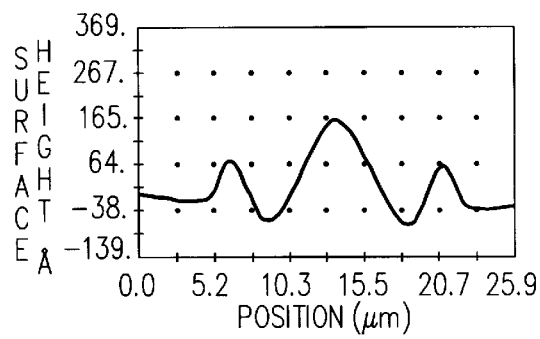
Figure 4F:
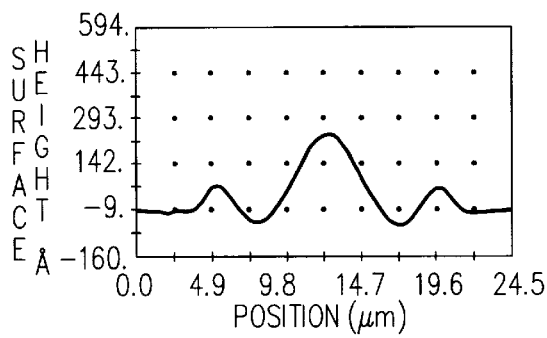
Figure 4G:
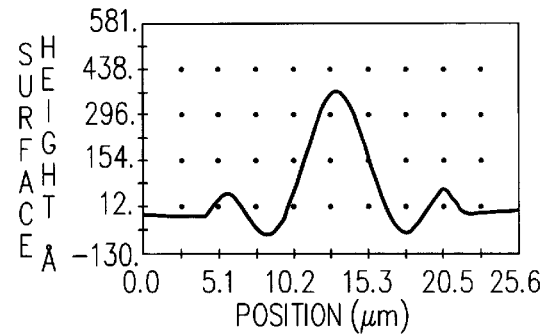
Figure 4H:
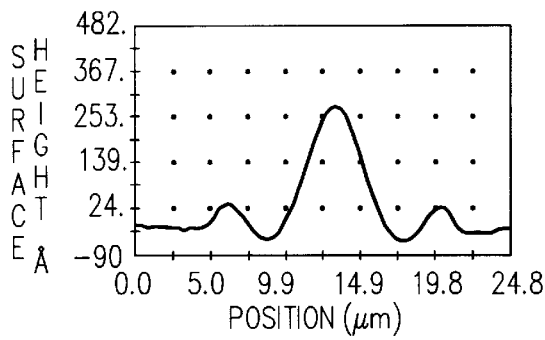
Figure 4I:
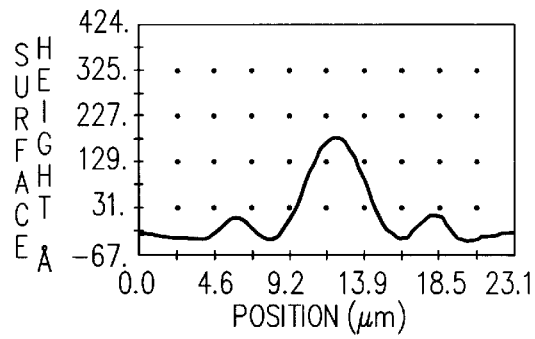
Figure 4J:
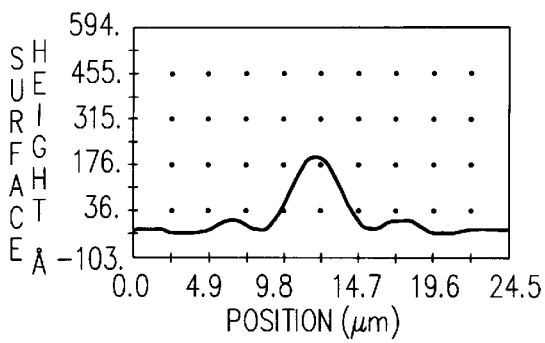
Figure 4K:
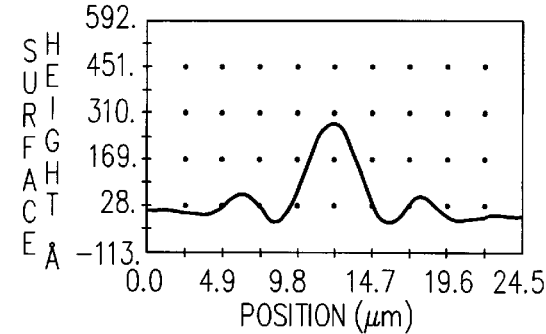

Referring to FIG. 6, a magnetic disk 61 in accordance with our invention is used in a magnetic disk drive 62. Disk 61 is mounted on a spindle 64 which is rotated by a motor 66, e.g. at about 4000 to 10,000 rpm. A pair of read-write heads 68a, 68b fly on either side of disk 61, and are used to read data from or write data to disk 61. Heads 68a, 68b can be either inductive read-write heads or magneto-resistive heads. Heads 68a, 68b are mounted on arms 70a, 70b, which in turn are moved by an actuator 72 so that heads 68a, 68b can be positioned over selected tracks of disk 61.

The components shown in FIG. 6 are conventional (other than disk 61). Disk drives are described in U.S. Pat. No. 4,949,202 (Kim); U.S. Pat. No. 5,025,335 (Stefansky); and U.S. Pat. No. 5,027,241 (Hatch), incorporated herein by reference.

While the invention has been described with regard to specific embodiments, those skilled in the art will appreciate that other Co-based or Fe-based magnetic alloys can be used for the magnetic film in disk 61. Also protective overcoats other than carbon can be used, e.g. $ZrO_2$. See U.S. Pat. No. 4,898,774, issued to Yamashita, incorporated herein by reference. Accordingly, all such changes came within our invention.

What is claimed is:

1. A method for manufacturing a magnetic disk comprising the steps of:

forming a layer of NiNb on a substrate, said substrate having a metallic surface;

laser texturing the layer of NiNb to form sombrero texture features; and forming a magnetic layer over the NiNb after said step of laser texturing said layer of NiNb.

2. Method of claim 1 wherein said substrate comprises NiP plated onto Al.

3. Method of claim 1 wherein said substrate comprises a material selected from the list consisting of glass, glass ceramic, Si, SiC, and ceramic, said substrate having a metallic layer formed thereon, said step of forming a layer of NiNb comprising the step of forming NiNb on said metallic layer.

4. Method of claim 1 further comprising the step of forming an underlayer between said layer of NiNb and said magnetic layer.

5. Method of claim 1 further comprising the step of forming an underlayer between said layer of NiNb and said magnetic layer and forming a protective overcoat over said magnetic layer.

6. Method of claim 1 wherein said sombrero texture features have a bump having a height between 7 and 25 nm.

7. Method of claim 6 wherein said sombrero texture features substantially lack a ridge surrounding said bump.

8. Method of claim 6 wherein said bump is surrounded by a ridge that has a ridge height at least 5 nm lower than the height of said bump.

9. Method of claim 6 wherein said bump is surrounded by a ridge that has a height at least 10 nm lower than the height of said bump.

10. Method of claim 1 further comprising the step of forming a protective overcoat over said magnetic layer.

11. A magnetic disk comprising:

a substrate having a metallic surface;

a NiNb layer formed on said metallic surface, said NiNb layer having laser-induced sombrero texture features formed thereon; and a magnetic layer on the NiNb layer.

12. Magnetic disk of claim 11 wherein said substrate comprises a material selected from the list of materials consisting of glass, glass ceramic, ceramic, SiC and Si, said disk comprising a metallic layer formed between said substrate and said NiNb layer.

13. Magnetic disk of claim 11 further comprising an underlayer between said NiNb layer and said magnetic layer and a protective overcoat formed on said magnetic layer.

14. Magnetic-disk of claim 11 wherein said substrate comprises NiP plated onto Al.

15. A magnetic disk drive comprising:

a magnetic disk including a substrate having a metallic surface, an NiNb layer formed on said metallic surface, and a magnetic layer formed on the NiNb layer, said NiNb layer having laser-induced sombrero texture features formed thereon;

a motor coupled to said magnetic disk for rotating said magnetic disk;

a read-write head for flying above said magnetic disk, and for reading data from and writing data to said magnetic disk; and an arm for holding said read-write head in proximity to said disk; and an actuator for moving said arm so that said read-write head may be placed over desired data tracks on said magnetic disk.

16. Disk drive of claim 15 wherein said disk comprises an underlayer between said NiNb layer and said magnetic layer, and a protective overcoat formed on said magnetic layer.

17. A magnetic disk comprising:

a substrate having a metallic surface;

a NiNb layer formed on said metallic surface, said NiNb layer having laser-induced texture features, at least a portion of said features protruding from the surface of said NiNb layer; and a magnetic layer on the NiNb layer, said texture features reducing the stiction exhibited by said disk.

18. A method for manufacturing a magnetic disk comprising the steps of:

forming a layer of NiNb on a substrate, said substrate having a metallic surface;

laser texturing the layer of NiNb; and depositing a magnetic layer over said layer of NiNb.

19. Method of claim 18 further comprising the step of forming an underlayer between said layer of NiNb and said magnetic layer.

* * * * *